Dec. 14, 1937.  A. B. WEBB  2,101,925
VALVE
Filed March 15, 1937
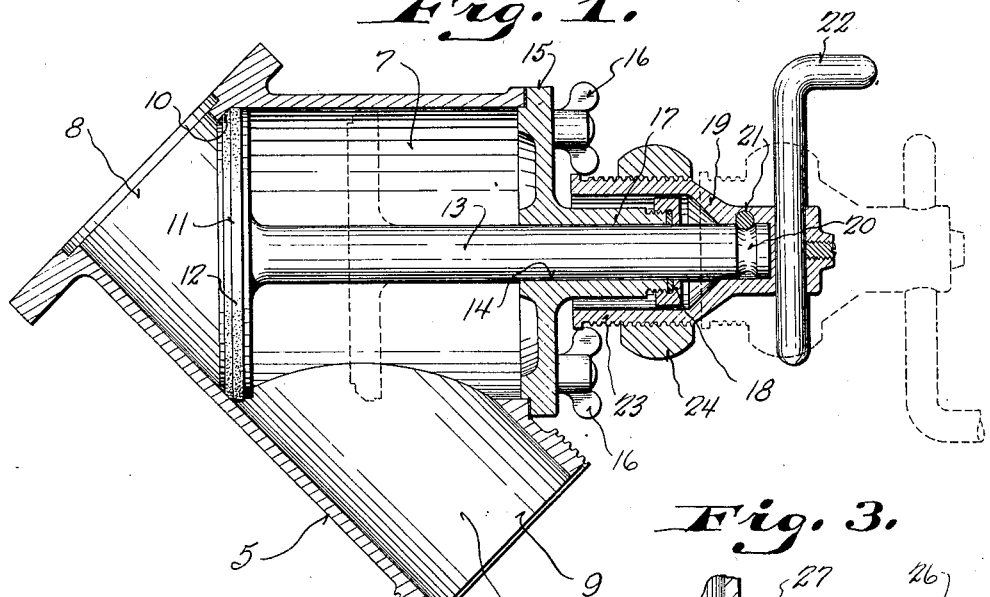
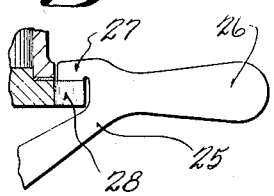
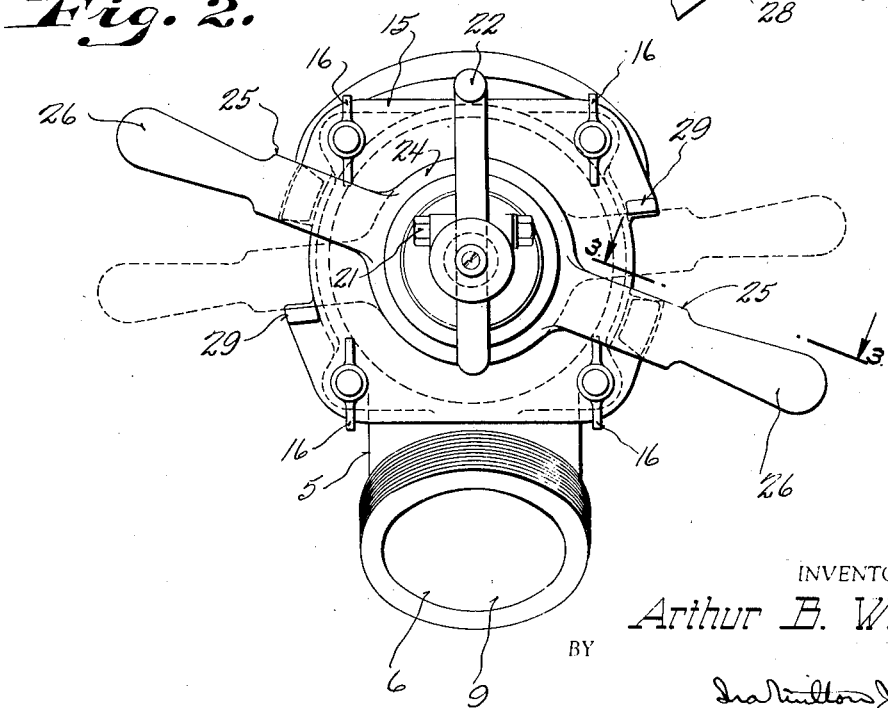
INVENTOR.
Arthur B. Webb
BY
ATTORNEY.

Patented Dec. 14, 1937

2,101,925

UNITED STATES PATENT OFFICE 2,101,925

VALVE

Arthur B. Webb, Milwaukee, Wis., assignor to Cream City Boiler Company, Milwaukee, Wis., a corporation of Wisconsin Application March 15, 1937, Serial No. 130,989

6 Claims. (Cl. 251—43)

This invention relates to improvements in valves and refers particularly to that type of valve known as a Y-valve.

In valves of this character considerable travel is required to carry the movable valve element to its fully opened position.

It is an object of this invention to provide means whereby this long travel of the valve element may be effected quickly, but without sacrificing the desirable screw action for securing the valve element closed.

With this broad general object in view, it is the purpose of this invention to provide quick acting means for securing the valve in its closed position, which is so designed as to release the valve element for quick opening movement with a minimum amount of manipulation.

It is also an object of this invention to provide quick acting means for securing the valve element closed, which is so designed that the threads of the screw are not disengaged during opening of the valve to preclude the possibility of damaging the threads.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which:

Figure 1 is a cross sectional view through a valve embodying this invention;

Figure 2 is an end view of the valve; and

Figure 3 is a detail sectional view taken on the plane of line 3—3 in Figure 2.

Referring now particularly to the accompanying drawing in which like numerals designate like parts, the numeral 5 designates the body of the valve, which as shown, consists of two brances 6 and 7 so joined as to substantially form a Y. One end 8 of the branch 6 provides the inlet and the opposite end 9 thereof is the outlet of the valve.

Valves of this type are used considerably in the handling of milk and are particularly desirable for use as discharge valves for storage tanks and the like. When so used, the valve is mounted as shown in Figure 1 with its branch 6 inclined downwardly and its branch 7 substantially horizontal.

At the inner terminus of the branch 7 a valve seat 10 is formed. This seat is disposed in a plane normal to the axis of the branch 7 and is adapted to receive a movable disc-like valve element 11. The periphery of the valve element 11 may be equipped with a rubber gasket 12 to engage the seat 10 upon closure of the valve.

Attached to the valve element is a stem 13, which is disposed co-axially to the branch 7 to slidably project through a central bore 14 in a cover plate 15, which closes the outer end of the branch 7.

The cover plate 15 is removably secured in position by four wing nuts 16 threaded on studs secured to the branch 7 and passing through openings in the cover plate. In this manner the entire valve structure is quickly removable from the body to permit cleaning and sterilizing, which is a paramount requirement of all equipment used for dairy purposes.

On the outer face of the cover 15 is a boss 17 through which the bore 14 continues. The outer end of this boss has a packing gland 18 mounted thereon to prevent leakage through the bore 14.

The end of the valve stem projects beyond the packing gland and has a screw 19 freely rotatably, but non-longitudinally movably attached thereto. Any desired means of attachment may be employed for this purpose and in the embodiment illustrated, the outer end of the stem has an annular groove 20 in which a pin 21 carried by the screw is received.

Secured in the outermost end of the screw beyond the end of the valve stem, is a handle 22 in the form of a cross bar, by which rotation may be imparted to the screw.

As illustrated, the screw has a skirt 23 which projects over the boss 17 on the cover plate, and the outer surface of this skirt is threaded for the reception of a yoke 24. The yoke 24 consists of a central tapped part which fits onto the threaded skirt of the screw, and diametrically projecting arms 25, the outer extremities of which are shaped to provide handles 26.

As shown in Figure 3, the arms 25 are directed at an angle towards the cover 15 and have fingers 27 adapted to engage in back of lugs 28 fixed to the cover plate. With the fingers 27 engaged in back of the lugs 28 the nut member is secured against movement away from the cover plate so that upon turning the screw inside the yoke, the movable valve element may be forced towards its seat or retracted therefrom. In operation, assuming that the valve is closed, and it is desired to open the same, the screw is first retracted by means of the handle bar 22, a distance sufficient to free the parts from strain.

Next, the yoke is turned from its full line position, shown in Figure 2, to its dotted line position to disengage its fingers 27 from the lugs 28. With the yoke thus freed from holding engagement with the cover plate 15, the entire valve unit is free to be pulled axially to the outer end of the branch 7 with a quick opening movement.

It is to be observed that the diametrically opposite handles on the yoke member are of strong husky construction permitting the application of a strong pull on the yoke so as to obviate the necessity for the use of tools of any kind in the opening of the valve.

If desired, stops 29 may be formed on the cover member to limit the opening rotation of the yoke, as clearly shown in Figure 2.

From the foregoing description taken in connection with the accompanying drawing, it will be readily apparent to those skilled in the art to which this invention appertains, that this invention provides a quick opening valve of exceptional simplicity, and that all parts thereof may be readily disassembled for cleaning and sterilizing; and that the construction is such that at no time is it necessary to disengage the threads of the screw parts to effect complete opening of the valve.

What I claim as my invention is:

1. In a valve of the character described, a valve body having a valve seat and a cover aligned with but spaced from the valve seat, a movable valve element adapted to engage said seat to close the valve, a valve stem connected with the movable valve element and extending slidably through said cover, a part having a readily disengageable connection with the cover to secure the same against movement away from the cover, and another part connected with the valve stem and having threaded engagement with the first named part, so that rotation of said second named part in one direction applies closing force onto the valve element, the reaction of which is carried through said first named part to the cover.

2. In a valve of the Y type, a movable valve element having a stem, a stationary part through which the stem is freely slidable, a member having a readily disengageable connection with said stationary part so that said member may be secured against movement away from said part and readily freed for such movement away from said part, and a second member connected with the valve stem and having a threaded engagement with said first named member so that a closing force may be applied to the valve member by rotation of said second named member, the reaction force incidental to such closure of the valve element being carried by said first named member, so that upon disengagement of said first named member from the stationary part quick opening of the valve element is possible.

3. In a valve of the character described, a valve seat, a movable valve element engageable with the seat, a stem connected with the valve element and moving axially to carry the valve element to and from the seat, a stationary part through which the stem is freely slidable, a yoke, a readily detachable connection between the yoke and the stationary part, a screw attached to the valve stem and having a threaded connection with the yoke so that upon turning of the screw with respect to the yoke, axial motion may be imparted to the valve stem providing the yoke is engaged with the stationary part, and whereby the assembled stem, screw, and yoke may be quickly moved in a direction away from the seat upon disengagement of the yoke from said stationary part.

4. In a valve of the character described, a valve body having a valve seat therein, a movable valve element adapted to engage said seat, said valve body being open above the seat to permit travel of the valve element to and from the seat and complete disassembly of the valve element from the body, a cover detachably secured to the body to close the same above the seat, a valve stem connected to the valve element and freely slidable through said cover, a yoke encircling the valve stem, cooperating means on the yoke and said cover providing a connection therebetween which is disengageable by a slight rotation of the yoke about the axis of the stem, and a screw connected to the stem and threaded into the yoke member so that axial movement may be imparted to the stem to close the valve upon rotation of the screw providing the connection between the yoke and the cover is established, and whereby a quick opening movement of the valve element may be effected by disengaging the yoke from the cover and applying an outward pull thereon.

5. In a valve of the character described, a valve body having a valve seat therein, a movable valve element adapted to engage said seat, said valve body being open above the seat to permit travel of the valve element to and from the seat and complete disassembly of the valve element from the body, a cover detachably secured to the body to close the same above the seat, a valve stem connected to the valve element and freely slidable through said cover, a yoke encircling the valve stem, cooperating means on the yoke and said cover providing a connection therebetween which is disengageable by a slight rotation of the yoke about the axis of the stem, a screw connected to the stem and threaded into the yoke member so that axial movement may be imparted to the stem to close the valve upon rotation of the screw providing the connection between the yoke and the cover is established, and whereby a quick opening movement of the valve element may be effected by disengaging the yoke from the cover and applying an outward pull thereon, and diametrically opposite handles on said yoke to permit the application of a strong outward pull on the yoke.

6. In a valve of the character described, a movable valve element, a stem for the movable valve element, a stationary part through which the stem is freely slidable, said part having a boss encircling the stem, a packing gland attached to the boss to prevent leakage past the stem, a screw member attached to the outer end of the stem and having a skirt extending over the boss, a screw thread on the outer surface of the skirt, a yoke having threaded engagement with said screw thread, oppositely extending arms on said yoke providing handles by which the yoke may be turned and moved axially with respect to the stem, and cooperating means on said yoke and the stationary part providing a connection therebetween which is readily detachable by a slight rotation of the yoke, and whereby axial movement may be imparted to the stem by rotation of the screw member providing the yoke and the stationary part are connected, and whereby axial movement may be imparted to the assembled stem, screw member, and yoke upon disengagement of said connection.

ARTHUR B. WEBB.